(12) United States Patent
Liikanen et al.

(10) Patent No.: US 7,787,209 B1
(45) Date of Patent: Aug. 31, 2010

(54) METHOD AND APPARATUS FOR COMPENSATING FOR REPEATABLE RUNOUT USING WIDE EMBEDDED RUNOUT CORRECTION FIELDS

(75) Inventors: Bruce A. Liikanen, Berthoud, CO (US); Curtis W. Egan, Thornton, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/378,617

(22) Filed: Mar. 16, 2006

Related U.S. Application Data

(60) Provisional application No. 60/662,433, filed on Mar. 16, 2005.

(51) Int. Cl.
*G11B 5/596* (2006.01)
(52) U.S. Cl. .................................................. 360/77.04
(58) Field of Classification Search ............. 360/77.04, 360/77.08, 75, 48, 66; 369/97; 318/629; 324/210
See application file for complete search history.

(56) References Cited

U.S. PATENT DOCUMENTS

| | | | |
|---|---|---|---|
| 3,725,764 A * | 4/1973 | Oswald | 318/629 |
| 4,412,165 A | 10/1983 | Case et al. | 318/636 |
| 5,436,773 A * | 7/1995 | Hanson | 360/66 |
| 5,760,990 A * | 6/1998 | Ukani et al. | 360/77.04 |
| 5,793,559 A | 8/1998 | Shepherd et al. | 360/78.09 |
| 6,091,564 A * | 7/2000 | Codilian et al. | 360/75 |
| 6,115,203 A | 9/2000 | Ho et al. | 360/77.04 |
| 6,198,584 B1 * | 3/2001 | Codilian et al. | 360/48 |
| 6,256,160 B1 * | 7/2001 | Liikanen et al. | 360/48 |
| 6,519,107 B1 * | 2/2003 | Ehrlich et al. | 360/75 |
| 6,549,362 B1 | 4/2003 | Melrose et al. | 360/77.04 |
| 6,608,477 B2 * | 8/2003 | Sacks et al. | 324/210 |
| 6,690,636 B1 * | 2/2004 | Marchant | 369/97 |
| 7,177,109 B2 * | 2/2007 | Ehrlich et al. | 360/75 |
| 7,177,110 B2 * | 2/2007 | Ehrlich et al. | 360/75 |
| 2006/0198042 A1 * | 9/2006 | Kaizu et al. | 360/77.08 |
| 2006/0203368 A1 * | 9/2006 | Kaizu et al. | 360/48 |
| 2006/0215310 A1 * | 9/2006 | Zayas | 360/77.08 |

* cited by examiner

*Primary Examiner*—Fred F. Tzeng
(74) *Attorney, Agent, or Firm*—Fellers, Snider, et al.

(57) ABSTRACT

A method and apparatus for compensating for repeatable runout using wide embedded runout correction fields is provided. In one embodiment, a disk surface is provided with a write head associated therewith. The disk surface has a data track having a width. An embedded runout correction (ERC) field is written onto the disk surface, wherein the ERC field has a width that is greater than the width of the data track.

11 Claims, 6 Drawing Sheets

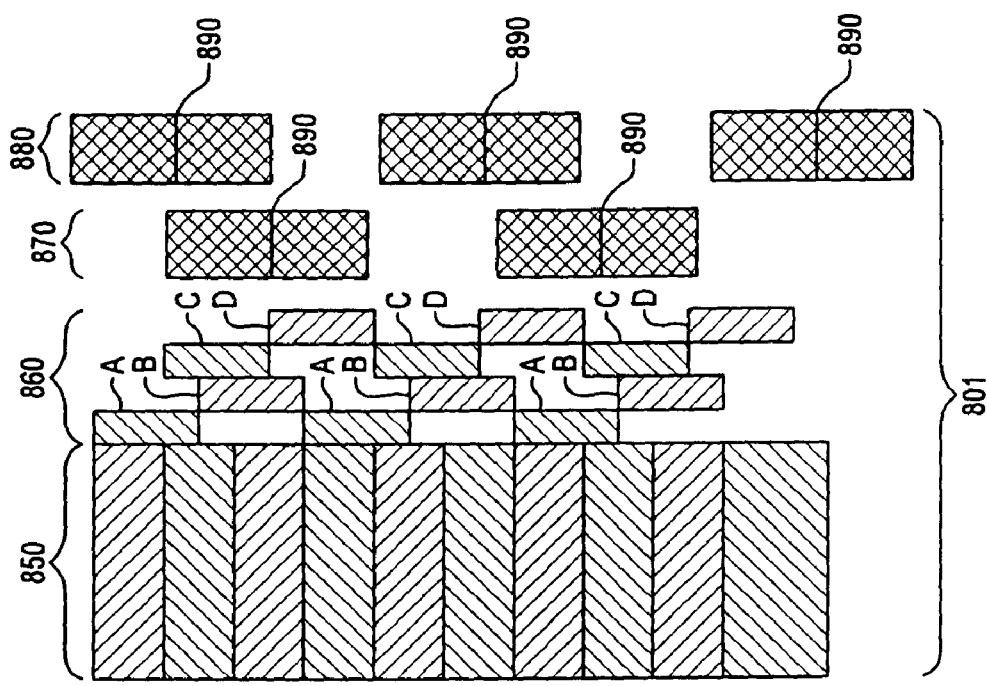
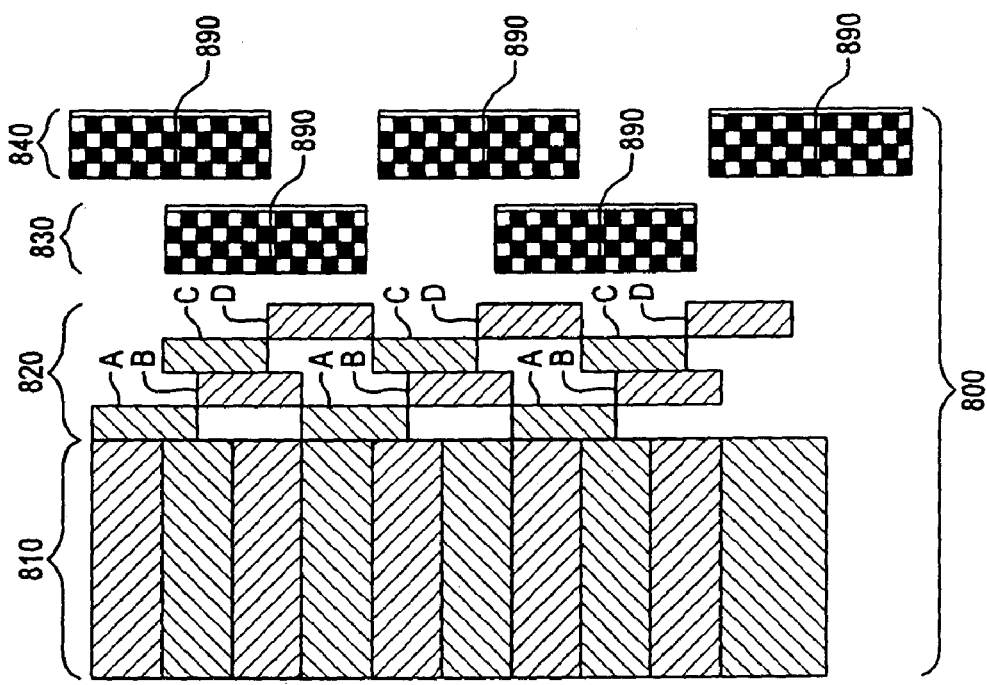
FIG. 8

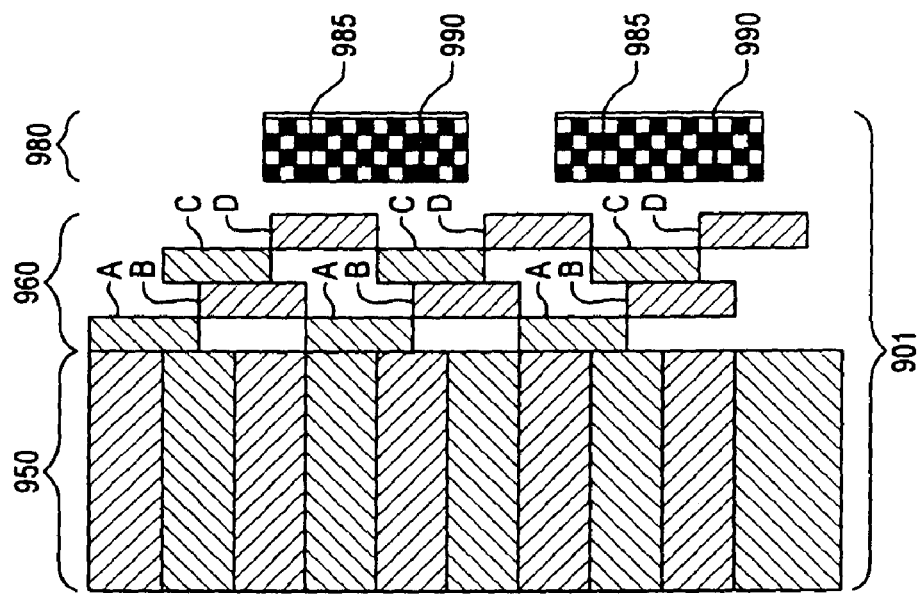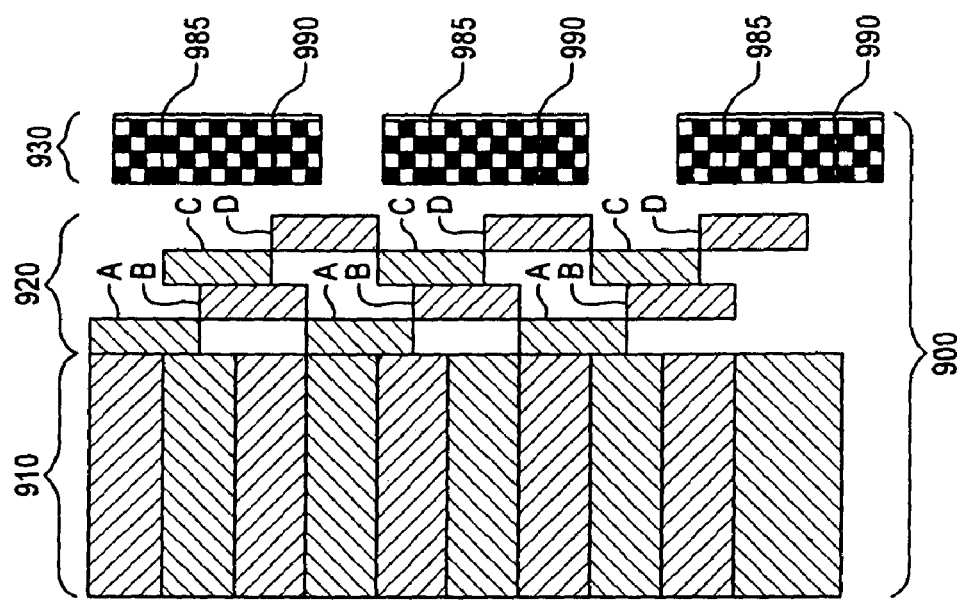

METHOD AND APPARATUS FOR COMPENSATING FOR REPEATABLE RUNOUT USING WIDE EMBEDDED RUNOUT CORRECTION FIELDS

CROSS-REFERENCE TO RELATED APPLICATIONS

This application claims priority from U.S. Provisional Application Ser. No. 60/662,433 filed Mar. 16, 2005, which is incorporated herein by reference in its entirety.

FIELD OF THE INVENTION

The present invention relates to transducer positioning in a data storage device. More particularly, the present invention relates to compensating to compensating for repeatable runout (RRO) in a disk drive using wide embedded runout correction (ERC) fields.

BACKGROUND OF THE INVENTION

A disk drive is a data storage device that stores digital data in tracks on a disk. Data is read from or written to a track of the disk using a transducer, which includes a read head and a write head. The transducer is held close to the track while the disk spins about its center at a substantially constant angular velocity. To properly locate the transducer near the desired track during a read or write operation, a closed-loop servo control system is generally implemented. The servo control system uses servo data read from the disk to align the transducer with the desired track.

Servo data is generally written to the disk using a servo track writer (STW). However, there has been movement towards having the disk drive self-servo write some or all of the servo data. Typically, servo data includes Gray code fields, which are used for coarse positioning, and servo bursts, which are used for fine positioning.

In an ideal disk drive, the tracks of the disk are non-perturbed circles situated about the center of the disk. As such, each of these ideal tracks includes a track centerline that is located at a known constant radius from the disk center. In an actual disk drive, however, it is difficult to write non-perturbed circular tracks to the disk. That is, due to certain problems (e.g., vibration, bearing defects, inaccuracies in the STW and disk clamp slippage), the tracks are generally written differently from the ideal non-perturbed circular shape. Positioning error created by the perturbed nature of these tracks is known as repeatable runout (RRO).

The perturbed shape of these tracks complicates the transducer positioning during read and write operations because the servo control system needs to continuously reposition the transducer during track-following to keep up with the constantly changing radius of the track centerline with respect to the center of the spinning disk. Furthermore, the perturbed shape of these tracks can result in track squeeze and track misregistration errors during read and write operations.

Disk drive manufacturers have developed techniques to measure the RRO, so that compensation values (also known as embedded runout correction (ERC) values) may be generated and used to position the transducer along an ideal track centerline. Examples of such techniques may be found in U.S. Pat. No. 4,412,165 to Case et al. entitled "Sampled Servo Position Control System," U.S. Pat. No. 5,793,559 to Shepherd et al. entitled "In Drive Correction of Servo Pattern Errors," U.S. Pat. No. 6,115,203 to Ho et al. entitled "Efficient Drive-Level Estimation of Written-In Servo Position Error" and U.S. Pat. No. 6,549,362 to Melrose et al. entitled "Method and Apparatus for the Enhancement of Embedded Runout Correction in a Disk Drive," all of which are incorporated herein by reference.

ERC values are calculated on a servo-sector-by-servo-sector basis. An ERC value associated with a particular servo sector is a digital value that represents the RRO measured for the servo sector. Typically, the ERC value for a particular servo sector is stored in an ERC field that is located at the end of the servo sector in a position that circumferentially follows the servo bursts. The servo control system applies the digital value to make a correction to essentially nullify the RRO for that specific servo sector.

ERC values are generally calculated during a disk drive's self-test. Once an ERC value has been calculated for a particular servo sector, it is written to an ERC field using the write head in a single pass (as opposed to multiple passes that are used to write each of the servo bursts, e.g., in a stitched fashion). Data is also written to a data track associated with the servo sector, using the write head, in a single pass. Accordingly, the ERC field has a width that is equal to a width of a data track.

Because the read head and the write head for a particular transducer are spaced from one another, the radial position of the write head is not necessarily the same as the radial position of the read head when writing to a particular location on the disk surface. In fact, the radial spacing between the write head and the read head generally varies across the disk surface due to changes in skew angle. (In some cases, this spacing can be a few tracks, or more, away.) This spacing is accounted for using a technique known as microjogging.

Instead of using a single type of ERC field, the assignee of the present invention uses two types of ERC fields, namely, a Write ERC field and a Read ERC field. If an offset exists between the radial location of the write head and the radial location of the read head when writing to a target data track, the write head will be placed at the radial location of the target data track and the read head will be at a different radial location. The Write ERC field is written at the radial location that the read head will be when the write head is writing to the target data track. The Read ERC field is generally aligned with the target data track to be read. Both the Write ERC field and the Read ERC field have a width that is equal to a width of a data track.

In addition to using Write ERC fields and Read ERC fields, the assignee of the present invention also interleaves such fields. That is, even servo sectors include Write ERC fields that hold Write ERC values associated with two servo sectors (e.g., the present even servo sector and the subsequent odd servo sector for a single track are stored in a single Write ERC field). Likewise, odd servo sectors include Read ERC fields that hold Read ERC values associated with two servo sectors (e.g., the present odd servo sector and the subsequent even servo sector for a single track are stored in a single Read ERC field).

As disk drive data capacities rise, track pitches become smaller and bit error rates become higher, the ability to read digital ERC values from ERC fields becomes more difficult. This problem is exacerbated when an ERC field is written in a position that is offset from its expected position. Accordingly, there is a need to develop a technique for improving the ability to read ERC values from ERC fields.

SUMMARY OF THE INVENTION

The present invention meets the aforementioned need. The present invention is directed to a method and apparatus for compensating for repeatable runout using wide embedded runout correction fields.

In one embodiment, a disk surface is provided with a write head associated therewith. The disk surface has a data track having a width. An embedded runout correction (ERC) field is written onto the disk surface, wherein the ERC field has a width that is greater than the width of the data track.

Other embodiments, objects, features and advantages of the invention will be apparent from the following specification taken in conjunction with the following drawings.

BRIEF DESCRIPTION OF THE DRAWINGS

FIG. 8 is a diagrammatic representation of an ERC field format for a disk surface that may be used with wide ERC fields of the present invention; and, FIG. 9 is a diagrammatic representation of another ERC field format for a disk surface that may be used with wide ERC fields of the present invention.

DETAILED DESCRIPTION OF THE PREFERRED EMBODIMENT

Figure 1:
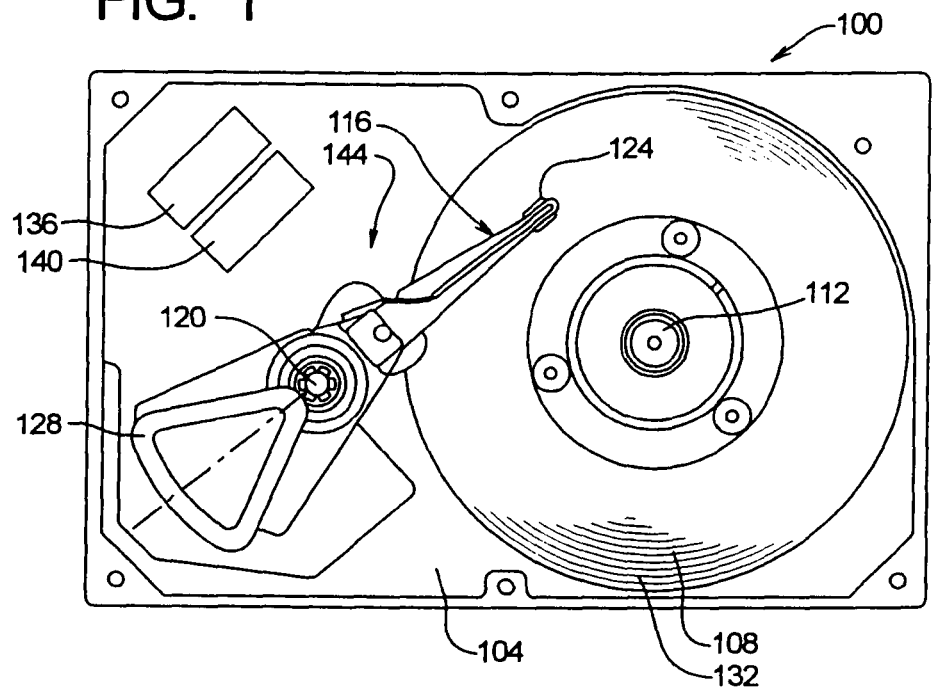
FIG. 1 is a diagrammatic representation of a conventional disk drive, with its top cover removed, in which the present invention may be implemented.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

FIG. 1 illustrates a disk drive 100 that includes a base 104 and a magnetic disk (or disks) 108 (only one of which is shown). The disk 108 is interconnected to the base 104 by a spindle motor (not shown) mounted within or beneath the hub 112, such that the disk 108 can be rotated relative to the base 104. An actuator arm assembly (or assemblies) 116 (only one of which is shown) is interconnected to the base 104 by a bearing 120. The actuator assembly 116 suspends a transducer 124 at a first end, and the transducer 124 (which includes a read head and a write head) transfers data to and from a surface on the disk 108. A voice coil motor 128 pivots the actuator arm assembly 116 about the bearing 120 to radially position the transducer 124 with respect to the disk 108. By changing the radial position transducer 124 with respect to the disk 108, the transducer 124 can access different tracks 132 on the disk 108. The voice coil motor 128 is operated by a controller 136 that is, in turn, operatively connected to a host computer (not shown). A channel 140 processes information read from the disk 108 by the transducer 124 with respect to the track 132 being followed. The servo control system 144 includes the transducer 124 being positioned, the actuator arm assembly 116, the voice coil motor 128, the controller 136 and the channel 140.

Figure 2:
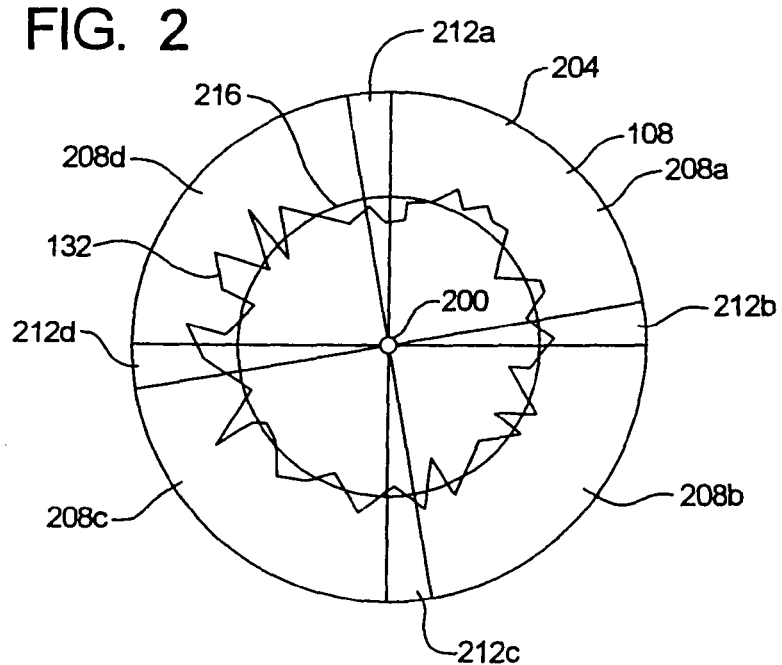
FIG. 2 is a diagrammatic representation of a disk having a perturbed track.

FIG. 2 illustrates the disk 108, which is substantially circular in shape and includes a center 200. The disk 108 also includes tracks 132 (only one of which is shown) on an upper surface 204 of the disk 108 for storing digital data. The tracks 132 are divided into data fields 208a-208d and servo sectors 212a-212d. Generally, the data fields 208a-208d are used for storing data as a series of magnetic transitions, while the servo sectors 212a-212d are used for storing servo information, also as a series of magnetic transitions, that provide the transducer 124 with positioning information. In particular, the servo sectors 212a-212d provide the transducer with information concerning its position over the disk 108. More particularly, the servo sectors 212a-212d provide information to the transducer 124 concerning the identity of the track 132 and the servo sector 212 over which the transducer 124 is flying, and concerning the position of the transducer 124 with respect to the centerline of the track 132.

Although the disk 108 is illustrated as having a relatively small number of tracks 132 and servo sectors 212, a typical disk contains a very large number of tracks 132 and servo sectors 212. For example, disks having over 100,000 tracks per inch and over 250 servo sectors per track are presently available.

Track 132 is ideally non-perturbed and ideally shares a common center 200 with the disk 108, such as the ideal track 216. Due to imperfections, however, the actual written track 132 can be perturbed, such as the non-ideal track 132.

A perturbed or non-ideal track 132 is difficult for the transducer 124 to follow because the position of the transducer 124 must constantly be adjusted by the servo control system 144. Consequently, positioning the transducer 124 is not as accurate on the written track 132 as it would be on the ideal track 216.

The tracks 132 are each divided into multiple data fields 208 and servo sectors 212. The servo sectors 212 include information for use by the disk drive 100 in locating the transducer 124 above a desired track 132. When a host computer requests that data be read from or written to a particular data field 208 in a particular track 132, the transducer 124 must be moved to the track 132 and then must be positioned at a predetermined location relative to the centerline of the track 132 before a data transfer can take place. The transducer 124 is place on the track centerline in order to read from and write to the disk 108. However, the present invention is not limited to reading and writing solely when the transducer 124 is placed at the track centerline. The present invention allows the transducer 124 to follow (approximately) the ideal representation (ideal track 216) of a perturbed track 132.

The disk drive 100 uses the information stored in the servo sectors 212 to locate the desired track 132 and to then appropriately position the transducer 124 with respect to the centerline of the desired track 132. The data fields 208 include user data that can be accessed by a host computer. In general, the number of servo sectors 212 per track 132 is a matter of design choice. The number may be dictated by, for example, a servo update rate.

Figure 3:
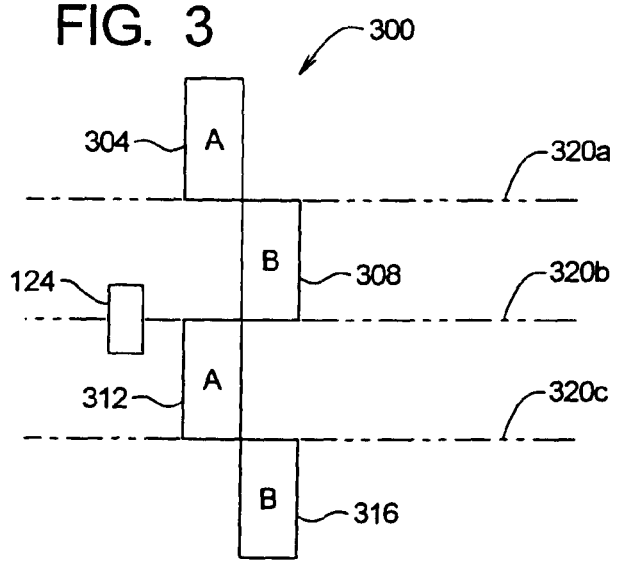
FIG. 3 is a diagrammatic representation of a servo burst pattern that may be used to position a transducer with respect to a track centerline.

FIG. 3 illustrates a typical servo pattern 300 stored within a servo sector 212 for centering the transducer head 124 on a desired track 132. The servo pattern 300 includes servo bursts 304, 308, 312 and 316 that define the centerlines 320a-320c of the tracks 132. The servo bursts 304, 308, 312 and 316 are divided into A servo bursts 304, 312 and B servo bursts 308, 316 that are each approximately a track-width wide and that alternate across the disk surface 204. The boundary between an A servo burst and an adjacent B servo burst (e.g., A servo burst 312 and B servo burst 308) defines the centerline (e.g., centerline 320b) of the track 132.

To center the transducer 124 using the A and B servo bursts, the transducer 124 is first moved to the desired track 132 during a seek operation and, once there, reads the A and B servo bursts on the desired track 132. The signal magnitudes resulting from reading the A and B servo bursts are then combined (such as by subtracting the B servo burst magnitude from the A servo burst magnitude) to achieve the PES. The PES indicates the distance between the center of the transducer 124 and the centerline (e.g., centerline 320b) of the desired track 132. The PES is used by the disk drive 100 to change the position of the transducer 124 to one that is closer to the desired (centered) position. This centering process is repeated for each successive servo sector 212 on the track 132 until the requested read/write operation has been performed in the appropriate data field 208. The present invention may be used with other schemes for storing servo information on the disk 108, such as schemes having four or more servo bursts, or schemes that use zones, constant linear density (CLD) recording, split data fields and/or hybrid servo.

Traditionally, the A servo bursts 304, 312 and the B servo bursts 308, 316 as well as all other servo information are written to the disk 108 using a STW after the disk 108 is assembled into the disk drive 100 during manufacturing. However, a variety of methods have been developed which do not use only the STW for writing servo information on the disk 108. For example, a portion of the servo information can be written using the STW and another portion of the servo information can be self-written by the transducers 124. Furthermore, the transducers 124 may self-write the entirety of the servo information. In addition, printed media may be used by the transducers 124 to self-write some or all of the servo information. The present invention may be used regardless of how the servo information is written to the disk 108. For example, RRO may occur even though only some (or in some cases none) of the RRO is due to a STW. That is, the servo information does not necessarily have to be written using a STW.

The A and B servo bursts define the location of the tracks 132 on the disk 108. That is, on a non-ideal track 132, the A and B servo bursts are written such that the centerline of the track 132 does not describe a perfect circle, but rather is perturbed. However, the transducer 124 can follow an ideal track 216 by adding appropriate ERC values in the servo sectors 212.

The offset between the centerline of the non-ideal track 132 and the ideal track 216 is different in each servo sector 212a-212d of the track 132. By determining RRO values for the servo sectors 212 in a track 132, the ERC values may modify the PES so that the transducer 124 can follow (or closely approximate) the ideal track 216. The ERC values may then be stored, for example, in the servo sectors 212, in look-up tables maintained in the disk drive 100 or in any other suitable storage location, such as memory included in or accessible to the disk drive 100.

If the transducer 124 is to follow a perturbed path, such as the non-ideal track 132, then the position of the transducer 124 must constantly be adjusted as the disk 108 rotates. Therefore, when performing conventional track following on a non-ideal track 132, adjustments are constantly made to position the transducer 124 to keep it centered on the track 132. The transducer 124 position is adjusted by deriving a PES from the servo bursts, such as the A servo burst 312 and the B servo burst 308 where the centerline 320b is followed. The PES created a control signal for the voice coil motor 128 (or other movement means) to move the transducer 124 an appropriate amount. Because the transducer 124 is continuously being adjusted, perfect or near perfect registration between the transducer 124 and the centerline of the track 132 (e.g., centerline 320b) is rarely achieved. This can create problems such as high track misregistration.

It should be noted that there is not necessarily a one-to-one correlation between the number of servo tracks and the number of data tracks, as is well-known to those skilled in the art. Accordingly, the servo track pitch (i.e., the center-to-center spacing between adjacent servo tracks in the radial direction) may be different from the data track pitch (i.e., the center-to-center spacing between adjacent data tracks in the radial direction).

Figure 4:
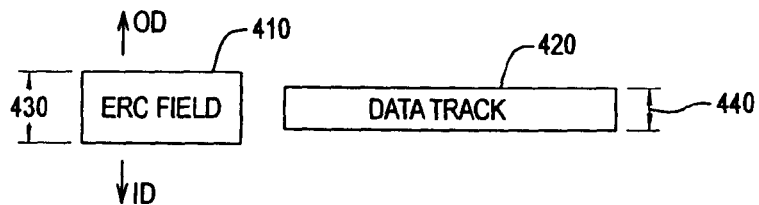
FIG. 4 is a diagrammatic representation of a wide ERC field and a data track.

According to the present invention, in order to improve the ability to read ERC values from ERC fields (especially when the read head is offset from the center of the track), wide ERC fields are used. FIG. 4 illustrates an ERC field 410 and a data track 420 associated with the ERC field 410. The ERC field 410 has a width 430 and the data track 440 has a width 440, wherein the widths are measured in a generally radial direction. The designators OD and ID indicate the direction of the outer diameter and the inner diameter, respectively, of the disk 108.

In contrast to a conventional ERC field where the width of the ERC field is equal to the width of the data track with which it is associated, in the present invention, the width 430 of the ERC field 410 is greater than the width 440 of the data track 420 with which it is associated (e.g., an adjacent data track). In one embodiment, the widths 430 of all (or substantially all) ERC fields 410 are greater than the widths 440 of all data tracks 440.

Figure 5:
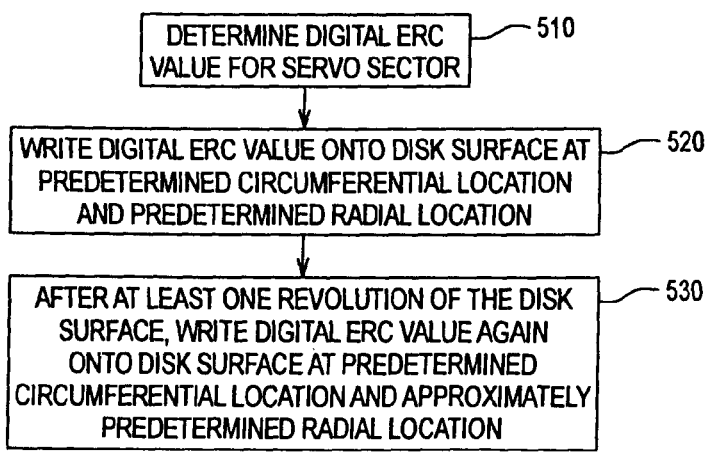
FIG. 5 is a flowchart illustrating a method for writing a wide ERC field in accordance with one embodiment of the present invention.

FIG. 5 is a flowchart illustrating a method for writing a wide ERC field 410 in accordance with one embodiment of the present invention. At step 510, an ERC value is determined for a particular servo sector. The ERC value is a digital value that represents the RRO measured for the servo sector. For purposes of the present invention, the manner by which the ERC value is obtained is not important. That is, the ERC value may be obtained using conventional techniques or even techniques that have yet to be developed.

At step 520, the digital ERC value is written onto the disk surface at a predetermined circumferential position (e.g., between servo bursts and a data track associated with the servo bursts) and at a predetermined radial position (e.g., approximately the center of a track) while the disk 108 is spinning. At step 530, after at least one revolution of the disk surface 204, the digital ERC value is again written onto the disk surface at the predetermined circumferential position and approximately the same radial position. Due to non-repeatable runout (NRRO), the write head will likely be placed at a radial position that is different from the radial position used when initially writing the digital ERC value. Of course, a large portion of the initially-written digital ERC value will be overwritten with the digital ERC value (which has the same value as the initially-written ERC value) that is being written following at least one revolution. Accordingly, the initial ERC value and ERC value written at least one revolution after the initial ERC value together form a wide ERC field 410.

It should be understood that additional wide ERC fields 410 may be written onto the disk surface 204 using the method described in FIG. 5.

Figure 6:
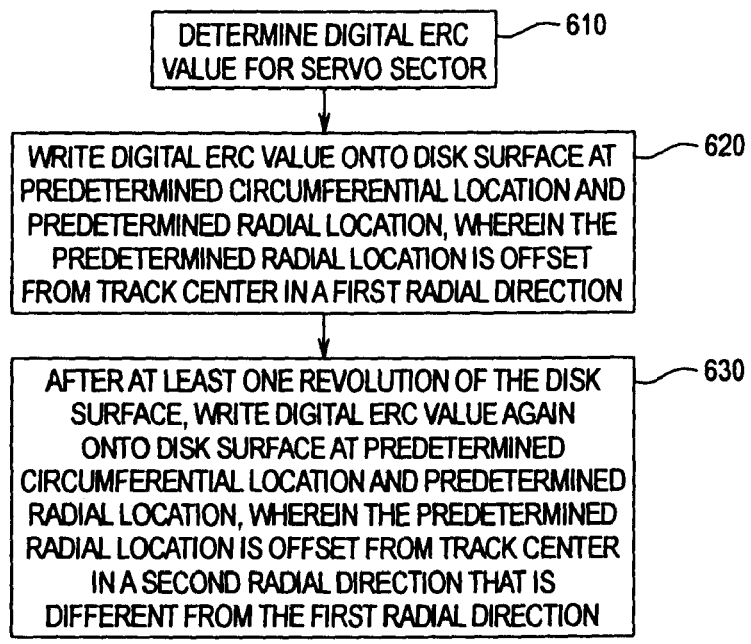
FIG. 6 is a flowchart illustrating a method for writing a wide ERC field in accordance with another embodiment of the present invention.

FIG. 6 is a flowchart illustrating a method for writing a wide ERC field 410 in accordance with another embodiment of the present invention. At step 610, an ERC value is determined for a particular servo sector. The ERC value is a digital value that represents the RRO measured for the servo sector. For purposes of the present invention, the manner by which the ERC value is obtained is not important. That is, the ERC value may be obtained using conventional techniques or even techniques that have yet to be developed.

At step 620, the digital ERC value is written onto the disk surface 204 (while the disk is spinning) at a predetermined circumferential position (e.g., between servo bursts and a data track associated with the servo bursts) and at a predetermined radial position that is radially offset from the center of a track in a first direction (e.g., towards the ID or the OD). In one embodiment, the offset may be about 5%. In another embodiment, the offset may be about 10%. In another embodiment, the offset may be about 15%. In yet another embodiment, the offset may be about 20%. Other offsets are possible and anticipated.

At step 630, after at least one revolution of the disk surface 204, the digital ERC value is again written onto the disk surface 204 (while the disk is spinning) at the predetermined circumferential position (e.g., between servo bursts and a data track associated with the servo bursts) and at a predetermined radial position that is radially offset from the center of a track in a second direction that is different from the first direction (e.g., towards the OD or the ID). In one embodiment, the offset may be about 5%. In another embodiment, the offset may be about 10%. In another embodiment, the offset may be about 15%. In yet another embodiment, the offset may be about 20%. Other offsets are possible and anticipated. It should be noted that the magnitude of the offset from the center of the track in the first direction does not necessarily have to be equal to the magnitude of the offset from the center of the track in the second direction.

Preferably (although not necessarily), at least a portion of the initially-written digital ERC value will be overwritten with the digital ERC value (which has the same value as the initially-written ERC value) that is being written following at least one revolution. Accordingly, the initial ERC value and ERC value written at least one revolution after the initial ERC value together form a wide ERC field 410.

Figure 7:
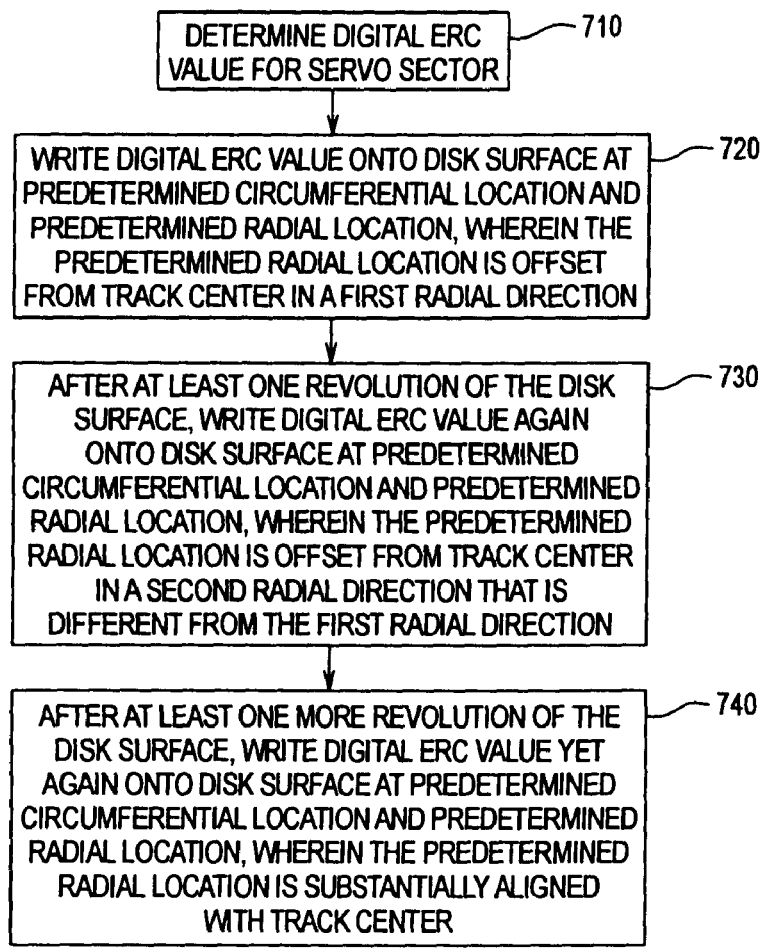
FIG. 7 is a flowchart illustrating a method for writing a wide ERC field in accordance with yet another embodiment of the present invention.

FIG. 7 is a flowchart illustrating a method for writing a wide ERC field 410 in accordance with yet another embodiment of the present invention. At step 710, an ERC value is determined for a particular servo sector. The ERC value is a digital value that represents the RRO measured for the servo sector. For purposes of the present invention, the manner by which the ERC value is obtained is not important. That is, the ERC value may be obtained using conventional techniques or even techniques that have yet to be developed.

At step 720, the digital ERC value is written onto the disk surface 204 (while the disk is spinning) at a predetermined circumferential position (e.g., between servo bursts and a data track associated with the servo bursts) and at a predetermined radial position that is radially offset from the center of a track in a first direction (e.g., towards the ID or the OD). In one embodiment, the offset may be about 5%. In another embodiment, the offset may be about 10%. In another embodiment, the offset may be about 15%. In yet another embodiment, the offset may be about 20%. Other offsets are possible and anticipated.

At step 730, after at least one revolution of the disk surface 204, the digital ERC value is again written onto the disk surface (while the disk is spinning) at the predetermined circumferential position (e.g., between servo bursts and a data track associated with the servo bursts) and at a predetermined radial position that is radially offset from the center of a track in a second direction that is different from the first direction (e.g., towards the OD or the ID). In one embodiment, the offset may be about 5%. In another embodiment, the offset may be about 10%. In another embodiment, the offset may be about 15%. In yet another embodiment, the offset may be about 20%. Other offsets are possible and anticipated. It should be noted that the magnitude of the offset from the center of the track in the first direction does not necessarily have to be equal to the magnitude of the offset from the center of the track in the second direction.

Preferably (although not necessarily), at least a portion of the initially-written digital ERC value will be overwritten with the digital ERC value (which has the same value as the initially-written ERC value) that is being written following at least one revolution.

At step 740, after at least one more revolution of the disk surface the digital ERC value is written onto the disk surface 204 yet again. This time, however, the digital ERC value is written (while the disk is spinning) at the predetermined circumferential position (e.g., between servo bursts and a data track associated with the servo bursts) and at a predetermined radial position that is substantially aligned with the center of a track.

Preferably (although not necessarily), at the digital ERC value written at the radial position substantially aligned with the center of the track will overwrite at least a portion of the digital ERC value written at the radial position offset in the first direction and will also overwrite at least a portion of the digital ERC value written at the radial position offset in the second direction.

Accordingly, the ERC value offset in the first direction relative to the center of the track, the ERC value offset in the second direction relative to the center of the track and the ERC value that is substantially aligned with the center of the track together form a wide ERC field 410.

It should be understood that one or more wide ERC fields 410 can be formed using embodiments other than those described above. Furthermore, while the embodiments described above refer to forming a wide ERC field, it should be understood that the same principals are used to form a plurality of wide ERC fields on the disk surface 204.

In some cases, the width 430 of an ERC field 410 can be such that it may encroach into adjacent tracks 132. In order to reduce the likelihood of encroachment, ERC field format changes may be required.

FIG. 8 is a diagrammatic representation of an ERC field format for a disk surface having wide ERC fields 410 stored thereon. FIG. 8 shows a portion of an even servo wedge 800 and a portion of an odd servo wedge 801. The portion of the even servo wedge 800 has even servo sector Gray code fields 810, servo bursts 820 (including A, B, C and D bursts) associated with the even servo sector Gray code fields 810, a first wide Write ERC field 830 and a second wide Write ERC field 840. The portion of the odd servo wedge 801 has an odd servo sector Gray code field 850, servo bursts 860 (including A, B, C and D bursts) associated with the odd servo sector Gray code fields 850, a first wide Read ERC field 870 and a second wide Read ERC field 880.

The even servo sectors hold write ERC values for two servo sectors. The first wide Write ERC field 830 holds a write ERC value for a servo sector associated with an even track and the second wide Write ERC field 840 holds a write ERC value for a servo sector associated with an odd track (or visa-versa). Similarly, the odd servo sectors hold read ERC values for two servo sectors. The first wide Read ERC field 870 holds a read ERC value for a servo sector associated with an odd track. Similarly, the second wide Read ERC field 880 holds a read ERC value for a servo sector associated with an even track (or visa-versa). Thus, collectively, the first and second Write ERC fields 830, 840 are interleaved with the first and second Read ERC fields 870, 880.

As shown in FIG. 8, the first wide Write ERC field 830 and the second wide Write ERC field 840 are radially offset from one another. In one embodiment, the first wide Write ERC field 830 and the second wide Write ERC field 840 are radially-aligned with one another.

The wide ERC fields 830, 840, 870, 880 of FIG. 8 have been written using the method described in connection with FIG. 6, since the wide ERC fields each include a seam 890 indicating where the ERC values have been stitched together. It should be understood that the wide ERC fields 830, 840, 870, 880 of FIG. 8 could have been written using a method different from the method described in connection with FIG. 6 (e.g., the method described in connection with FIG. 7).

FIG. 9 is a diagrammatic representation of another ERC field format for a disk surface having wide ERC fields 410 stored thereon. FIG. 9 shows a portion of an even servo wedge 900 and a portion of an odd servo wedge 901. The portion of the even servo wedge 900 has even servo sector Gray code fields 910, servo bursts 920 (including A, B, C and D bursts) associated with the even servo sector Gray code fields 910, a first wide Write ERC field 930. The portion of the odd servo wedge 901 has an odd servo sector Gray code field 950, servo bursts 960 (including A, B, C and D bursts) associated with the odd servo sector Gray code fields 950 and a second wide Write ERC field 980. Accordingly, in the ERC field format of FIG. 9, no wide Read ERC fields are provided.

The even servo sectors hold write ERC values for a first servo sector associated with a first even track and a second servo sector associated with a second even track. Similarly, the odd servo sectors hold write ERC values for a first servo sector associated with a first odd track and a second servo sector associated with a second odd track.

By using the format described in connection with FIG. 9, a wide Write ERC field (e.g., 930, 980) is permitted to be two tracks wide before it encroaches on an adjacent wide Write ERC field.

The wide Write ERC fields 930, 980 of FIG. 9 have been written using the method described in connection with FIG. 7, since the wide ERC fields each include both a first seam 985 and a second seam 990, which indicate where the ERC values have been stitched together. It should be understood that the wide Write ERC fields 930, 980 of FIG. 9 could have been written using a method different from the method described in connection with FIG. 7 (e.g., the method described in connection with FIG. 6).

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising:
   providing a disk surface having a write head associated therewith, the disk surface including a data track having a width;
   writing an embedded runout correction (ERC) field onto the disk surface, wherein the ERC field has a width that is greater than the width of the data track.

2. The method of claim 1, further including:
   determining an ERC value associated with a servo sector on the disk surface; and,
   at a first time, writing the ERC value onto the disk surface;
   at a second time, writing the ERC value onto the disk surface, such that at least a portion of the ERC value written at the first time is overwritten by the ERC value written at the second time.

3. The method of claim 2, wherein at least a portion of the ERC value written at the first time is not overwritten by the ERC value written at the second time.

4. The method of claim 3, wherein the portion of the ERC value written at the first time that was not overwritten by the ERC value written at the second time and the ERC value written at the second time comprise the wide ERC field.

5. The method of claim 2, wherein difference between the first time and the second time corresponds to multiple of a time required for a revolution of the disk surface.

6. The method of claim 2, wherein the ERC value is a digital value.

7. The method of claim 2, comprising:
   at a third time, writing the ERC value onto the disk surface, such that at least a portion of the ERC value written at the first time and at least a portion of the ERC value written at the second time is overwritten by the ERC value written at the third time.

8. The method of claim 7, wherein at least a portion of the ERC value written at the first time and at least a portion of the ERC value written at the second time is not overwritten by the ERC value written at the third time.

9. The method of claim 8, wherein the ERC field includes the portion of the ERC value written at the first time which was not overwritten by either the ERC value written at the second time and the ERC value written at the third time, the portion of the ERC value written at the second time which was not overwritten by the ERC value written at the third time, and the ERC value written at the third time.

10. The method of claim 9, wherein difference between the second time and the third time corresponds to multiple of a time required for a revolution of the disk surface.

11. A disk drive comprising:
    a disk surface having a write head associated therewith, the disk surface including a data track having a width;
    an embedded runout correction (ERC) field written onto the disk surface using the write head, wherein the ERC field has a width that is greater than the width of the data track.

* * * * *